United States Patent [19]

Robinson et al.

[11] Patent Number: 5,017,058

[45] Date of Patent: May 21, 1991

[54] MECHANICAL FINE ADJUST BORING HEAD

[75] Inventors: Wayne Robinson; Kenneth Noggle, both of West Bloomfield, Mich.

[73] Assignee: GTE Valenite Corporation, Troy, Mich.

[21] Appl. No.: 289,148

[22] Filed: Dec. 23, 1988

[51] Int. Cl.$^5$ .............................................. B23B 29/03
[52] U.S. Cl. .................................. 408/173; 408/147; 408/241 G; 279/6; 409/134
[58] Field of Search ............... 408/147, 150, 173, 174, 408/203, 241 G, 153; 279/6; 82/158, 1.4, 1.5; 409/234, 134

[56] References Cited

U.S. PATENT DOCUMENTS

| | | | |
|---|---|---|---|
| 322,636 | 7/1885 | Pement | 279/6 |
| 981,566 | 1/1911 | Jarvis | 279/6 |
| 984,000 | 2/1911 | Hull | 279/6 |
| 3,685,917 | 8/1972 | Patt | 408/150 |
| 4,467,679 | 8/1984 | Johne et al. | 408/150 X |

FOREIGN PATENT DOCUMENTS 553693  3/1923  France .............................. 408/173

OTHER PUBLICATIONS

Mechanical Engineering Design, p. 487, 1983.

*Primary Examiner*—Larry I. Schwartz
*Assistant Examiner*—Robert Schultz
*Attorney, Agent, or Firm*—Bill C. Panagos; David J. Koris

[57] ABSTRACT

Mechanical fine adjust boring head including an adjustment drive train through a worm wheel drive of an eccentric cam orbiting a drive key engaging a slide to effect linear radial adjustment. Anti-friction bearings for the cam and orbital drive connection between the cam and drive key provide for smooth nonbinding adjustment.

4 Claims, 1 Drawing Sheet

MECHANICAL FINE ADJUST BORING HEAD

BACKGROUND OF THE INVENTION

Numerous fine adjustment boring features have been employed identified in the trade as "Easy Set", "Microdex", "Flexidex" and "Camset" employing differential screws, set screws and other microadjustable units to accomplish fine adjustment on larger diameters. One example of a fine adjusting head relevant to the present invention is sold under the tradename Komet KFK, MICROADJUSTABLE BORING HEAD. The head includes a tool slide radially adjustable by means of a feed screw extending through the slide with a nut and dial on opposite ends rotatable to effect radial adjustment of the slide. A vernier scale on the dial provides accurate calibration and a substantial adjustment range comparable to that of the present invention.

BRIEF DESCRIPTION OF THE PRESENT INVENTION

Most fine adjustment features have too limited a range of adjustment. Others involve a binding action with stick slip characteristics rendering precise adjustment difficult. The present invention is directed to provide a substantially range of adjustment with worm and worm wheel actuation combined with needle bearings to provide a smooth highly precise fine adjustment that will not bind. Planar surface slide elements having substantial area contact are actuated through eccentric cam means having needle bearings adapted to smooth the drive originated through the worm and worm wheel manual actuation.

DETAILED DESCRIPTION OF PREFERRED EMBODIMENT

Figure 1:
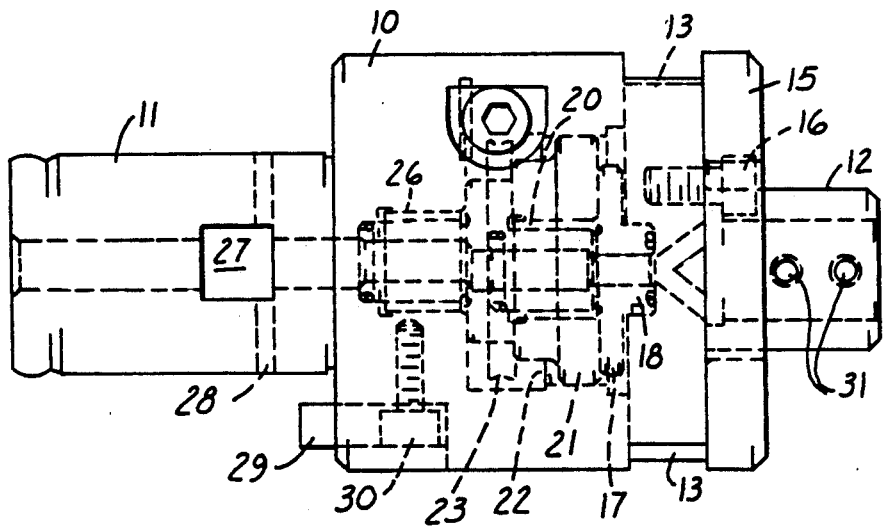
FIG. 1 is a side elevation of the boring head of the present invention.
Figure 2:
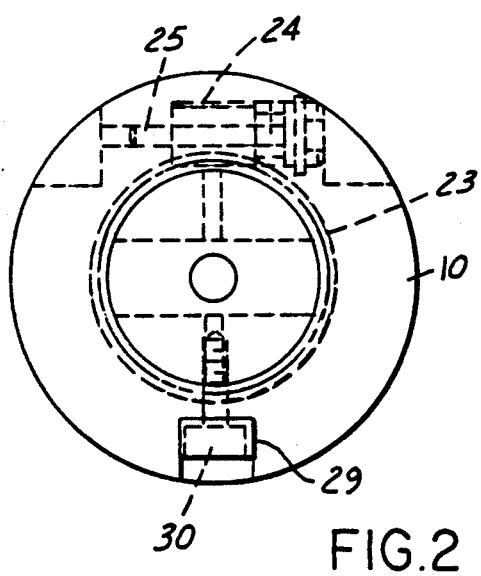
FIG. 2 is a rear view of the head illustrated in FIG. 1.
Figure 3:
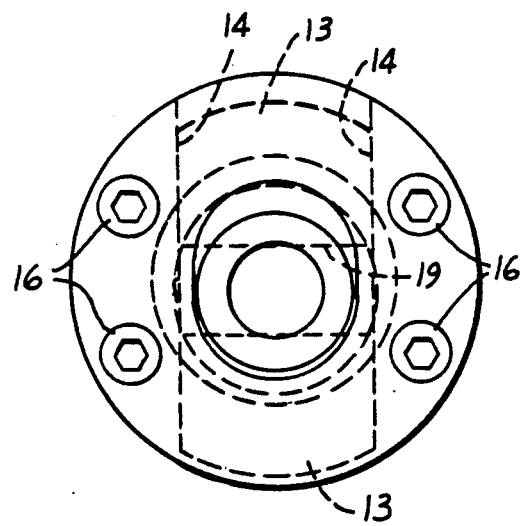
FIG. 3 is a face view of the head illustrated in FIG. 1.

With reference to the three figures, boring head body 10, equipped with integral drive shank 11, has adjustable tool slide 12 with integral radial extensions 13 slidable within radial slot 14 extending completely through the face end of the body and operatively retained by cover 15 secured to the end of the body by four machine screws 16. Drive key 17 further includes cylindrical stub shaft 20 which is piloted by needle bearings and is driven in an orbital path within cam 21. Cam 21 is driven by worm wheel 23 mounted thereon and worm gear 24 piloted on pin 25. An integral stub shaft extending from cam 21 extends within needle bearing 26 completing the anti-friction mounting of the cam and drive key.

Rectangular aperture 27 extending through shank 11, together with differential screw passage 28, accommodate right and left-hand wedge elements, not shown, to retain the shank end body of the boring head in a conventional rotary drive unit. Drive key 29 retained by screw 30 completes the manual adjusting boring head with tapped screw holes 31 serving for retention of an operating boring tool, not shown.

In operation, cam 21 is supported on either side of worm wheel 23 mounted thereon by plane bearing 22 and needle bearing 26 so that worm gear 24 may gradually rotate cam 21 with a positive free driving force. Eccentric needle bearing 20 in turn gradually orbits flatted drive key 18, gradually added justine tool slide 12 and its guided extensions 13 with a precise nonstick actuation assured by the substantial engagement length of drive key 18 within elongated secondary slot 19. While adjustment feed rate will vary with the orbital position of cam 21, a substantial range of adjustment is available equal to double the eccentricity of cam bearing 20 and the high total reduction of the worm wheel drive as well as the small radial adjustment displacement of the eccentric, even at its maximum rate position, assures a highly precise capability of moving the tool slide in very minute increments perferably relative to an exterior gaging unit. The total drive adjustment range is available with no possibility of binding at any orbital position of the cam.

We claim:

1. A mechanical fine adjust boring head comprising an annular body having a radial cross slot, a tool holder slide mounted for radial adjustment in said slot, a secondary cross slot in said slide extending normal to said radial cross slot, a drive key engageable in an orbital path with said secondary cross slot to effect radial adjustment displacement of said slide, cam means rotatably mounted in said body with an exterior annular surface coaxial with said annular body and an internal eccentrically oriented cylindrical surface corresponding to said eccentric orbital path, said drive key including a cylindrical stub shaft extending within said eccentrically oriented cylindrical surface and a flatted drive projection engaging said secondary cross slot, and means including a worm and worm wheel means for rotating said cam means to effect an orbital adjustment actuation of said drive key and corresponding linear displacement of said slide in said radial cross slot.

2. Boring head of claim 1 including anti-friction bearing means interposed between said eccentrically oriented cylindrical surface and said cylindrical stub shaft.

3. Boring head of claim 2 including a stub shaft projecting from said cam means, anti-friction bearing means in said body for supporting said cam means stub shaft at a position axially spaced from said coaxial cylindrical surface with said worm and worm wheel means interposed therebetween.

4. Boring head of claim 1 wherein said radial cross slot extends as an open through slot at one end of said boring head, and apertured cover means attached to said end on either side of said slot to retain said tool holder slide in operating adjustable position, said tool holder slide including an annular tool holder projecting through said apertured cover, the aperture providing clearance for the complete range of radial adjustment.

* * * * *